United States Patent
Gaunt et al.

(10) Patent No.: US 6,725,963 B2
(45) Date of Patent: Apr. 27, 2004

(54) ENERGY SAVING CONTROL SYSTEM AND METHOD FOR REDUCING POWER CONSUMPTION OF AN ELECTRO-HYDRAULIC POWER STEERING SYSTEM FOR A HYBRID VEHICLE

(75) Inventors: Michael C Gaunt, Metamora, MI (US); Andrew R. Dixon, Warren, MI (US)

(73) Assignee: General Motors Corporation, Detroit, MI (US)

( * ) Notice: Subject to any disclaimer, the term of this patent is extended or adjusted under 35 U.S.C. 154(b) by 12 days.

(21) Appl. No.: 10/177,707

(22) Filed: Jun. 21, 2002

(65) Prior Publication Data

US 2003/0234135 A1 Dec. 25, 2003

(51) Int. Cl.[7] .............................................. H02K 17/32
(52) U.S. Cl. ........................ 180/419; 180/421; 180/444; 318/434
(58) Field of Search ................................ 180/417, 419, 180/421, 422, 446, 444, 443, 65.2; 318/434; 701/41

(56) References Cited

U.S. PATENT DOCUMENTS

| | | | | |
|---|---|---|---|---|
| 5,209,317 A | * | 5/1993 | Schnelle | 180/417 |
| 5,641,033 A | * | 6/1997 | Langkamp | 180/422 |
| 5,967,253 A | * | 10/1999 | Collier-Hallman | 180/421 |
| 6,052,633 A | * | 4/2000 | Fukuyama et al. | 701/41 |
| 6,069,460 A | * | 5/2000 | Grabowski et al. | 318/434 |
| 6,073,721 A | * | 6/2000 | Grabowski | 180/422 |
| 6,092,618 A | * | 7/2000 | Collier-Hallman | 180/422 |

* cited by examiner

Primary Examiner—Lesley D. Morris
Assistant Examiner—Tony Winner
(74) Attorney, Agent, or Firm—Laura C. Hargitt

(57) ABSTRACT

An energy saving system and method reduces power consumption of an electro-hydraulic power steering system of a hybrid vehicle. The electro-hydraulic power steering system includes a first controller that communicates with an electric motor that is coupled to a hydraulic pump. The first controller selects Standby, On or Off operating modes for the electro-hydraulic power steering system. The first controller applies power to the electric motor and the first controller based on the selected operating mode to reduce power consumption. The first controller turns the first controller off and the motor off when in the Off operating mode. The first controller turns the electric motor off and the controller on when in the Standby operating mode. The first controller turns the electric motor on and the controller on when in the On operating mode.

18 Claims, 4 Drawing Sheets

US 6,725,963 B2

ENERGY SAVING CONTROL SYSTEM AND METHOD FOR REDUCING POWER CONSUMPTION OF AN ELECTRO-HYDRAULIC POWER STEERING SYSTEM FOR A HYBRID VEHICLE

FIELD OF THE INVENTION

The present invention relates to power steering systems for vehicles, and more particularly to an energy saving control system and method for an electro-hydraulic power steering system for a hybrid vehicle.

BACKGROUND OF THE INVENTION

Vehicles including hybrid powertrains incorporate two or more devices for powering the vehicle. For example, hybrid vehicles often include an internal combustion engine (ICE) or a diesel engine as a primary power source. An electric machine such as an integrated flywheel alternator stator or an electric motor are often used as a secondary power source. These hybrid vehicles also usually include an electro-hydraulic power steering system that provides power assisted steering and braking.

The electro-hydraulic power steering system typically includes an electric motor that rotates an input shaft of a hydraulic pump. The electric motor is powered by batteries or an alternator depending upon which power source is currently active. The hydraulic pump supplies pressurized hydraulic fluid to a brake booster. Hydraulic pressure from the hydraulic pump is also used to assist the movement of a steering gear, which turns the wheels of the vehicle. Hydraulic fluid from the steering gear is returned to a reservoir that is connected to the hydraulic pump.

A primary goal of the hybrid powerplant is to improve the energy efficiency of the hybrid vehicle. Reducing the energy consumption of major power-consuming components in the hybrid vehicle is necessary to achieve this goal. The electro-hydraulic power steering system is a major vehicle component that consumes a significant amount of power.

To reduce the power consumption of the power steering system, an electro-hydraulic power steering system with a closed center valve and a high-pressure accumulator has been proposed. This power steering system attempts to reduce energy consumption during non-steering conditions. This system, however, reduces steering performance, increases packaging requirements, reduces reliability and response times, and increases system complexity and cost.

SUMMARY OF THE INVENTION

An electro-hydraulic power steering system and method for a hybrid vehicle includes an electric motor and a hydraulic pump that is coupled to the electric motor. A first controller communicates with the electric motor, selects one of a plurality of operating modes of the electro-hydraulic power steering system and applies power to the electric motor based on the selected one of the operating modes.

In other features, the operating modes include Standby, On and Off operating modes. The first controller turns the first controller off and the electric motor off when in the Off operating mode. The first controller turns the electric motor off and the first controller on when in the Standby operating mode. The first controller turns the electric motor on and the first controller on when in the On operating mode.

In other features, the first controller selects the On operating mode when a gear selector of the hybrid vehicle is not in park and an ignition switch is in a Run position after passing through a Start position. The first controller selects the Off operating mode when an ignition switch of the hybrid vehicle is in an off/lock position. The first controller selects the Standby operating mode when the ignition switch of the hybrid vehicle is an accessory position.

In yet other features, when the first controller selects the Standby operating mode, the first controller switches to the On operating mode when at least one of steering and brake input occurs. The first controller returns the electro-hydraulic power steering system to the Standby mode after a first period if additional brake and steering inputs do not occur.

In other features, when an electric power takeoff (EPTO) mode of the hybrid vehicle is selected, the first controller selects the Off operating mode.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a flowchart illustrating steps for powering a controller and an electric motor of the electro-hydraulic power steering system based upon the selected operating mode.

DETAILED DESCRIPTION OF THE PREFERRED EMBODIMENTS

The following description of the preferred embodiment(s) is merely exemplary in nature and is in no way intended to limit the invention, its application, or uses.

Figure 1:
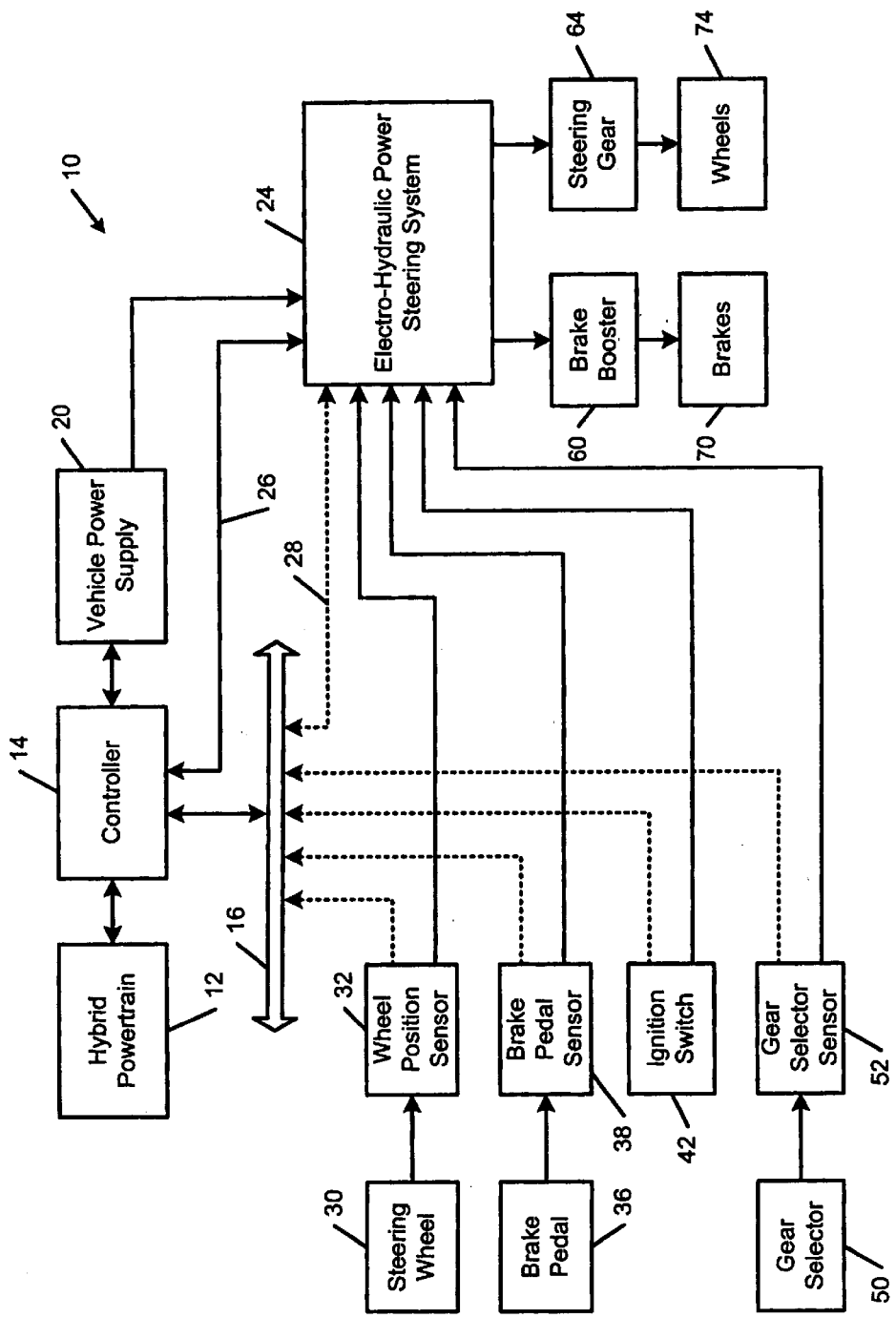
FIG. 1 is a functional block diagram of an energy saving control system according to the present invention for an electro-hydraulic power steering system of a hybrid vehicle.

Referring now to FIG. 1, a hybrid vehicle 10 includes a hybrid powertrain 12 that is coupled to a controller 14. While a direct connection is shown between the controller 14 and the hybrid powertrain 12, the connection may be made through a vehicle data bus 16. The controller 14 is also connected to a vehicle power supply 20. The vehicle power supply 20 may provide DC voltage such as 14V or 42V.

The controller 14 communicates with an electro-hydraulic power steering system 24. The controller 14 preferably includes a processor, electronic memory such as read only memory (ROM), random access memory (RAM), flash memory or any other suitable electronic storage, and an input/output interface. Alternately, the controller 14 can be an application specific integrated circuit (ASIC). The controller 14 may be connected directly and/or indirectly (through the vehicle data bus 16) to the electro-hydraulic power steering system 24 as indicated at 26 and 28.

A steering wheel 30 is coupled to a steering wheel position sensor 32. The steering wheel position sensor 32 generates steering signals that are transmitted via the vehicle data bus 16 to the electro-hydraulic power steering system 24 and/or communicated directly to the electro-hydraulic power steering system 24. A brake pedal 36 is coupled to a brake pedal sensor 38. The brake pedal sensor 38 generates a brake pedal position signal that is transmitted via the vehicle data bus to the electro-hydraulic power steering system 24 and/or transmitted directly to the electro-hydraulic power steering system 24.

An ignition switch 42 is connected to the vehicle data bus 16 and/or to the electro-hydraulic power steering system 24. The ignition switch 42 may be operated by a key, a keycard, a keypad or any other suitable method. The ignition switch 42 preferably includes one or more positions such as "Off/Lock", "RUN", "Accessory", and "Start/Crank" positions. A gear selector 50 is coupled to a gear selector sensor 52. The gear selector sensor 52 generates a gear position signal that is transmitted via the vehicle data bus 16 to the electro-hydraulic power steering system 24 and/or directly to the electro-hydraulic power steering system 24. The gear selector 50 preferably has one or more gear positions such as Park, Reverse, Neutral, and Forward (such as Drive and Low) positions.

The electro-hydraulic power steering system 24 can include first and second hydraulic circuits that are coupled to a brake booster 60 and a steering gear 64. Alternately, a single hydraulic circuit may be used. For example, a hydraulic fluid output of the brake booster 60 can be used to supply pressurized hydraulic fluid to the steering gear 64. A hydraulic fluid output of the steering gear 64 is returned to a hydraulic fluid reservoir. Skilled artisans will appreciate that other plumbing variations may be employed without departing from the spirit of the invention. The brake booster 60 hydraulically actuates brakes 70 of the hybrid vehicle 10. The steering gear 64 turns wheels 74 of the hybrid vehicle 10.

Figure 2:
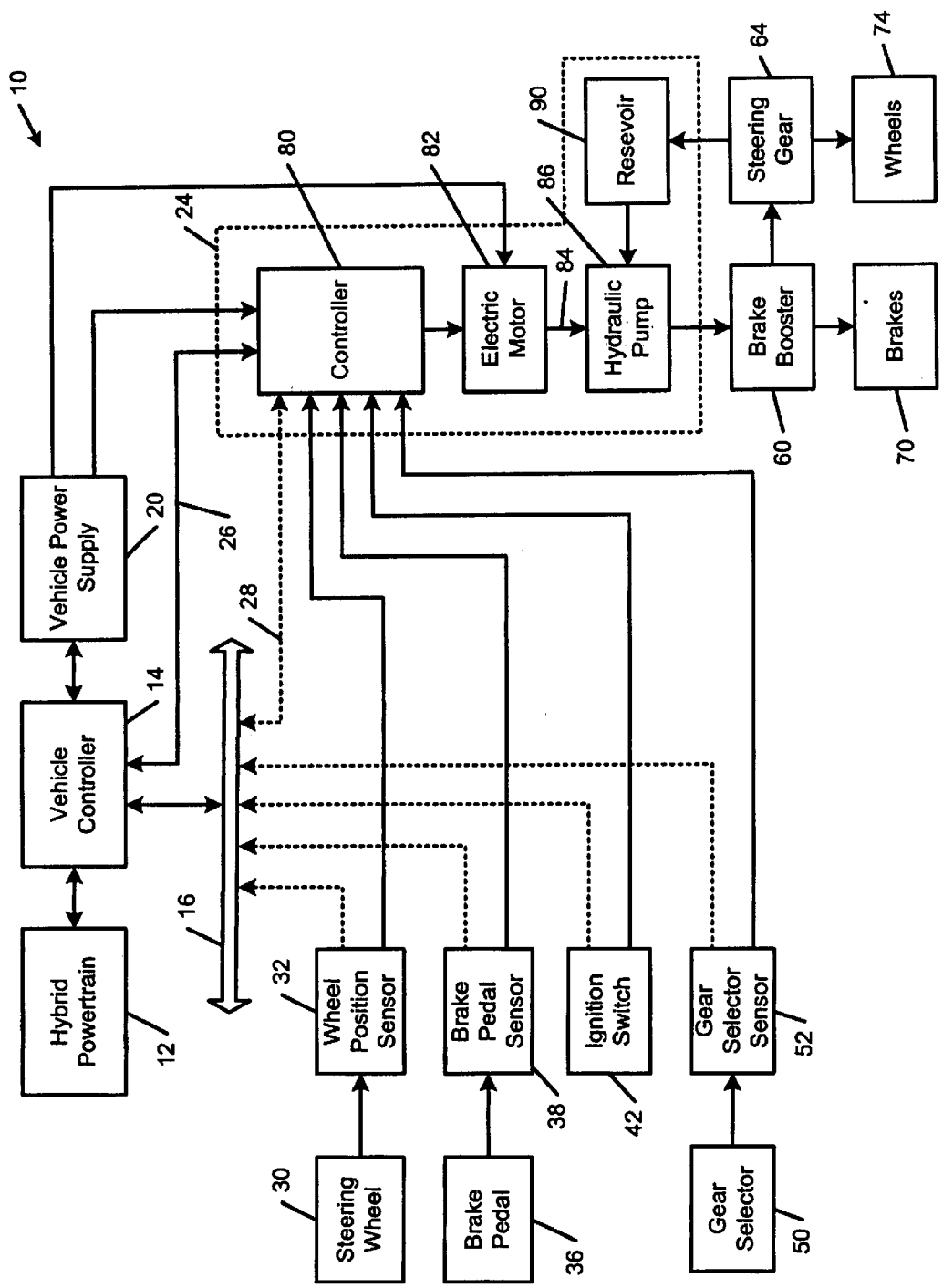
FIG. 2 is a functional block diagram illustrating the energy saving control system for the electro-hydraulic power steering system of FIG. 1 in further detail.

For purposes of clarity, reference numerals from FIG. 1 will be used in FIG. 2 to identify similar elements. In FIG. 2, an exemplary electro-hydraulic power steering system 24 is illustrated in further detail. The electro-hydraulic power steering system 24 includes a controller 80 that is connected to an electric motor 82. An output shaft 84 of the electric motor 82 is connected to a hydraulic pump 86. The hydraulic pump 86 pumps pressurized hydraulic fluid to a brake booster 60. Pressurized hydraulic fluid is also output by the brake booster 60 to the brakes 70 (when needed) and to the steering gear 64. The hydraulic circuit is completed by a hydraulic fluid connection between the steering gear 64 and a reservoir 90. Skilled artisans will appreciate that other hydraulic configurations of the electro-hydraulic power steering assembly may be employed.

Figure 3:
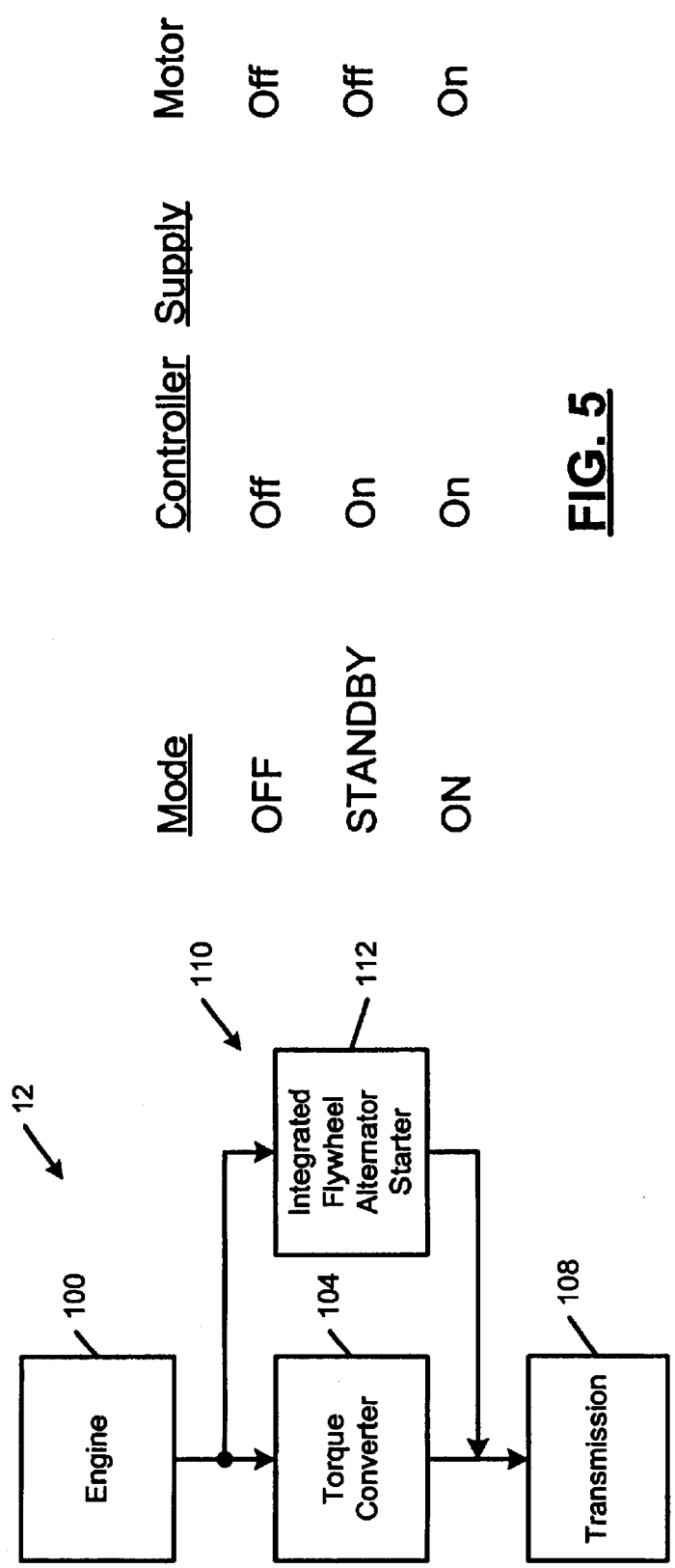
FIG. 3 is a functional block diagram illustrating an exemplary hybrid powertrain for the hybrid vehicle.

Referring now to FIG. 3, an exemplary hybrid powertrain 12 is illustrated and includes an engine 100 such as an internal combustion engine or a diesel engine. An output of the engine 100 is coupled by a torque converter 104 to a transmission 108. An electric machine 110 such as an integrated flywheel alternator starter 112 is connected across the torque converter 104. Skilled artisans will appreciate that other hybrid powertrains 12 may be employed without departing from the present invention.

Figure 4:
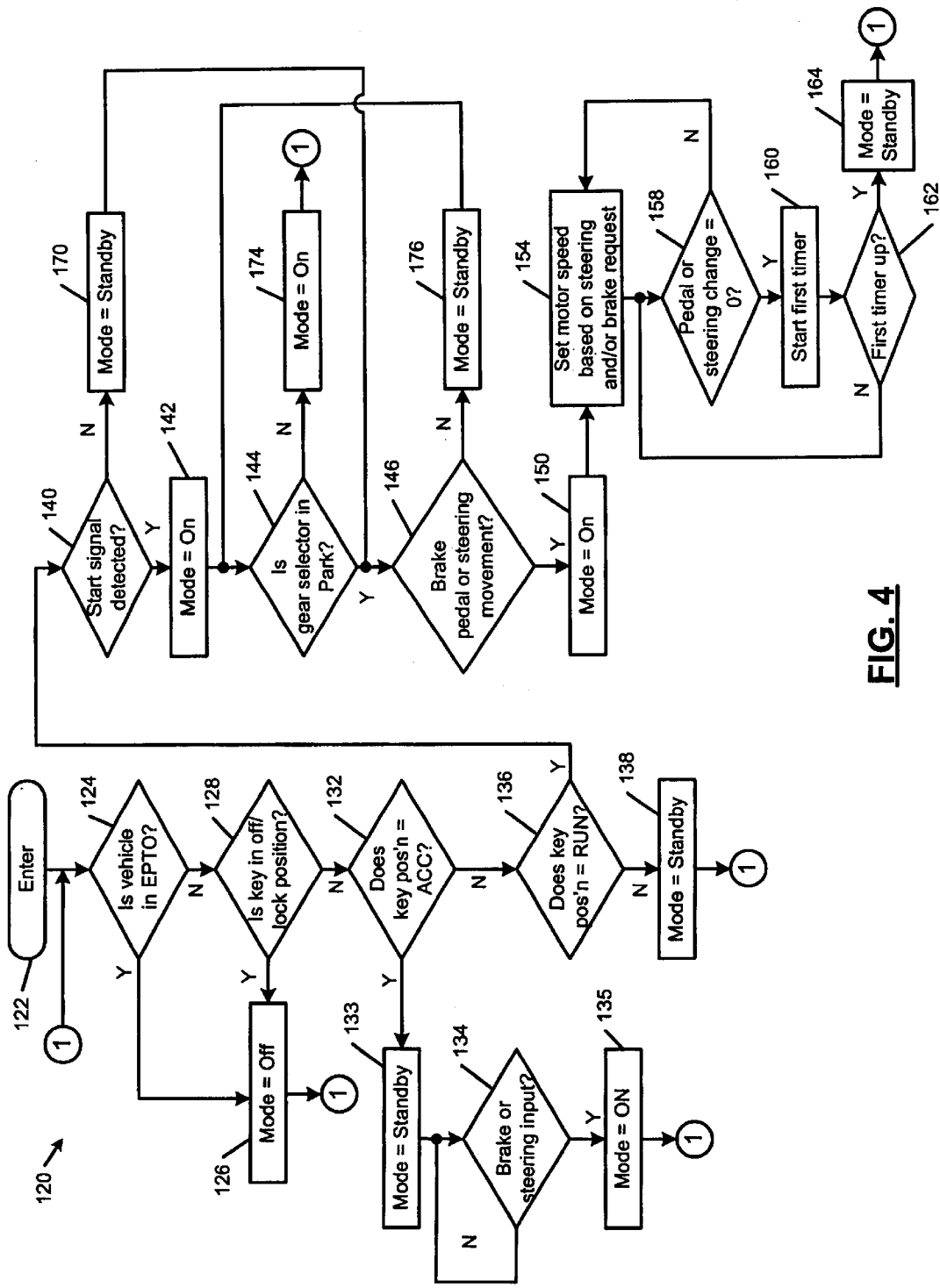
FIG. 4 is a flowchart illustrating steps performed by the energy saving control system for selecting an operating mode of the electro-hydraulic power steering system.

Referring now to FIG. 4, steps for selecting an operating mode of the electro-hydraulic power steering system 24 are shown generally at 120. Control begins with step 122. In step 124, control determines whether the vehicle is operating in electric power takeoff (EPTO) mode. If true, control continues with step 126 where the mode is set equal to Off and control loops back to step 124. If false, control determines whether the key is in the Off/Lock position in step 128. If true, control continues with step 126. If false, control determines whether the key position is equal to accessory (ACC) in step 132. If true, control continues to step 133 where the mode is set equal to Standby. In step 134, control determines whether brake or steering input occurred. If not, control loops back to step 134. Otherwise, control continues with step 135 where the mode is set equal to On. Control loops from step 135 to step 124.

In step 136, control determines whether the key is in the Run position. If false, the mode is set equal to Standby in step 138 and control loops back to step 124. If true, control determines whether the start signal is detected in step 140. If true, control continues with step 142 where the mode is set equal to On. Control determines whether the gear selector is in Park in step 144. If true, control continues determines whether brake or steering movement occurred in step 146. If true, control sets the mode equal to On in step 150. In step 154, the motor speed is set based on steering and/or brake input. Control determines whether pedal or steering change is equal to zero in step 158. If false, control loops back to step 154. If true, control continues with step 160 where the first timer is started. Control determines whether the first timer is up in step 162. If not, control loops back to step 158. Otherwise, control continues with step 164 and sets the mode equal to Standby and loops back to step 124.

If the start signal is not detected in step 140, control continues with step 170, sets the mode equal to Standby, and continues with step 146. If the gear selector is not in Park as determined in step 144, control sets the mode equal to On in step 174 and loops back to step 124. If brake or steering movement is not detected in step 146, control sets the mode equal to Standby in step 176 and loops back to step 144.

Referring now to FIG. 5, a table showing ON/OFF states for powering the controller 80 and the electric motor 82 of the electro-hydraulic power steering system 24 based on the operating mode are shown. If the operating mode is Off, the controller 80 is turned off. Power to the electric motor 82 is also turned off. If the operating mode is Standby, the controller 80 is turned on. Power to the electric motor 82 is also turned off. If the operating mode is On, the controller 80 is turned on. Power to the motor is also turned on.

Since the brake pedal 36 must be depressed to operate a brake/transmission shift interlock, a brake pedal signal that is generated by the brake pedal sensor identifies an operating mode change ahead of the gear selector signal. In addition to the signals described above, other messages generated by the vehicle data bus may be employed to adjust the operation and power consumption of the electro-hydraulic power steering system. For example, an electric power takeoff (EPTO) signal such as 120V or 220V plugs or a TCC/Cruise Dump signal can be used in addition to the signals listed above to further improve vehicle drivability or economy. If the 120V or 220V plug of the EPTO is being used and the hybrid vehicle is acting as a generator, the controller 80 is set in the OFF mode. While the energy saving control method is executed by the controller 80, other vehicle controllers may be used.

The energy saving control system according to the present invention minimizes the energy consumption of the electro-hydraulic power steering system. The reduced energy consumption improves the fuel economy of the hybrid vehicle. The electro-hydraulic power steering system consumes less energy and therefore reduces the power requirements of the hybrid or secondary power source. The energy that is not used by the electro-hydraulic power steering system may be used to power other functions such as remote starting (such as when the batteries are low and the ignition switch is in the off/lock position) and electric power takeoff. In addition, lower energy consumption of the electro-hydraulic power steering system improves hybrid function by allowing batteries to hold their charge longer. This also reduces the need to run the engine for recharging. The present invention also extends the life of the electro-hydraulic power steering system because the electro-hydraulic power steering system spends less time running. When power assist is not required, noise and vibration levels are also minimized.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An electro-hydraulic power steering system for a vehicle, comprising:
    an electric motor;
    a hydraulic pump that is coupled to said electric motor;
    a first controller that communicates with said electric motor, that selects one of a plurality of operating modes of said electro-hydraulic power steering system and that applies power to said electric motor based on said selected one of said operating modes;
    wherein said operating modes include Standby, On and Off operating modes; and
    wherein said first controller turns said electric motor off and said first controller on when in said Standby operating mode.

2. The electro-hydraulic power steering system of claim 1 wherein said first controller turns said first controller off and said electric motor off when in said Off operating mode.

3. The electro-hydraulic power steering system of claim 1 wherein said first controller turns said electric motor on and said fast controller on when in said On operating mode.

4. An electro-hydraulic power steering system for a vehicle, comprising:
    an electric motor;
    a hydraulic pump that is coupled to said electric motor;
    a first controller that communicates with said electric motor, that selects one of a plurality of operating modes of said electro-hydraulic power steering system and that applies power to said electric motor based on said selected one of said operating modes;
    wherein said operating modes include Standby, On and Off operating modes; and
    wherein said first controller selects said On operating mode when a gear selector of said vehicle is not in park and an ignition switch of said vehicle is in a RUN position after passing through a Start position.

5. An electro-hydraulic power steering system for a vehicle, comprising:
    an electric motor;
    a hydraulic pump that is coupled to said electric motor;
    a first controller that communicates with said electric motor, that selects one of a plurality of operating modes of said electro-hydraulic power steering system and that applies power to said electric motor based on said selected one of said operating modes;
    wherein said operating modes include Standby, On and Off operating modes; and
    wherein said first controller selects said Off operating mode when an ignition switch of said vehicle is in an off/lock position.

6. The electro-hydraulic power steering system of claim 5 wherein said first controller selects said Standby operating mode when said ignition switch of said vehicle is an accessory position.

7. An electro-hydraulic power steering system for a vehicle, comprising:
    an electric motor;
    a hydraulic pump that is coupled to said electric motor;
    a first controller that communicates with said electric motor, that selects one of a plurality of operating modes of said electro-hydraulic power steering system and that applies power to said electric motor based on said selected one of said operating modes;
    wherein said operating modes include Standby, On and Off operating modes; and
    wherein when said first controller selects said Standby operating mode, said first controller switches to said On operating mode when at least one of steering and brake input occurs.

8. The electro-hydraulic power steering system of claim 7 wherein said first controller returns said electro-hydraulic power steering system to said Standby mode after a first period if additional brake and steering inputs do not occur.

9. An electro-hydraulic power steering system for a vehicle, comprising:
    an electric motor;
    a hydraulic pump that is coupled to said electric motor;
    a first controller that communicates with said electric motor, that selects one of a plurality of operating modes of said electro-hydraulic power steering system and that applies power to said electric motor based on said selected one of said operating modes;
    wherein said operating modes include Standby, On and Off operating modes; and
    wherein when said vehicle is used as a generator for electric power takeoff, said electro-hydraulic power steering system switches to said Off mode.

10. A method for reducing power consumption of an electro-hydraulic power steering system of a vehicle, comprising:
    selecting one of a plurality of operating modes including Standby, On and Off operating modes for an electro-hydraulic power steering system including an electric motor and a first controller;
    applying power to said electric motor and said first controller base on said selected one of said operating modes to reduce power consumption; and
    turning said electric motor off and said first controller on when in said Standby operating mode.

11. The method of claim 10 further comprising turning said first controller off and said motor off when in said Off operating mode.

12. The method of claim 10 further comprising turning said electric motor on and said first controller on when in said On operating mode.

13. The method of claim 10 further comprising switching to said On operating mode when at least one of steering and brake input occurs while said electro-hydraulic power steering system is in said Standby operating mode.

14. The method of claim 13 further comprising returning said electro-hydraulic power steering system to said Standby mode after a first period if additional brake and steering inputs do not occur.

15. The method of claim 10 wherein, when said vehicle is used as a generator for electric power takeoff, said electro-hydraulic power steering system switches to said Off mode.

16. A method for reducing power consumption of an electro-hydraulic power steering system of a vehicle, comprising:

selecting one of a plurality of operating modes including Standby, On and Off operating modes for an electro-hydraulic power steering system including an electric motor and a first controller;

applying power to said electric motor and said first controller based on said selected one of said operating modes to reduce power consumption; and selecting said Off operating mode when an ignition switch of said vehicle is in an off/lock position.

17. A method for reducing power consumption of an electro-hydraulic power steering system of a vehicle, comprising:

selecting one of a plurality of operating modes including Standby, On and Off operating modes for an electro-hydraulic power steering system including an electric motor and a first controller;

applying power to said electric motor and said first controller based on said selected one of said operating modes to reduce power consumption; and selecting said Off operating mode when an ignition switch of said hybrid vehicle is in an off/lock position.

18. The method of claim 17 further comprising selecting said Standby operating mode when said ignition switch of said vehicle is an accessory position.

* * * * *